United States Patent
Siret et al.

(10) Patent No.: US 9,543,617 B2
(45) Date of Patent: Jan. 10, 2017

(54) LITHIUM-ION BATTERY CONTAINING AN ELECTROLYTE COMPRISING AN IONIC LIQUID

(75) Inventors: Clemence Siret, Bruges (FR); Lucas Caratero, Angouleme (FR); Philippe Biensan, Carignan de Bordeaux (FR)

(73) Assignee: SAFT, Bagnolet (FR)

( * ) Notice: Subject to any disclaimer, the term of this patent is extended or adjusted under 35 U.S.C. 154(b) by 1419 days.

(21) Appl. No.: 12/664,616

(22) PCT Filed: Jun. 12, 2008

(86) PCT No.: PCT/FR2008/000802
§ 371 (c)(1),
(2), (4) Date: May 4, 2010

(87) PCT Pub. No.: WO2009/007540
PCT Pub. Date: Jan. 15, 2009

(65) Prior Publication Data
US 2010/0209783 A1    Aug. 19, 2010

(30) Foreign Application Priority Data
Jun. 15, 2007 (FR) .................... 07 04264

(51) Int. Cl.
*H01M 10/056* (2010.01)
*H01M 10/0568* (2010.01)
(Continued)

(52) U.S. Cl.
CPC ..... *H01M 10/0568* (2013.01); *H01M 10/0525* (2013.01); *H01M 10/0567* (2013.01);
(Continued)

(58) Field of Classification Search
CPC ............ H01M 10/4235; H01M 10/056; H01M 2300/0025; H01M 2300/0028; H01M 2300/0045; H01M 2300/0037; Y02E 60/122
(Continued)

(56) References Cited

U.S. PATENT DOCUMENTS

| 6,541,162 B1 | 4/2003 | Song et al. |
| 2005/0158623 A1 | 7/2005 | Matsui et al. |

(Continued)

FOREIGN PATENT DOCUMENTS

| EP | 1 380 569 A1 | 1/2004 |
| EP | 1 557 889 A2 | 7/2005 |

(Continued)

OTHER PUBLICATIONS

"N-Methyl-N-propylpiperidinium bis(trifluoromethanesulfonyl)imide (PP13-TFSI)—novel electrolyte base for Li battery" Electrochemistry Communication 5 (2003) 594-598 published by Sakaebe et al.*

(Continued)

*Primary Examiner* — Basia Ridley
*Assistant Examiner* — Heng Chan
(74) *Attorney, Agent, or Firm* — Sughrue Mion, PLLC

(57) ABSTRACT

A lithium-ion battery containing: a positive electrode, a negative electrode, an electrolyte comprising: an organic solvent chosen from the group comprising carbonates, linear esters of a saturated acid, or a mixture thereof, an additive capable of forming a passivation film on the surface of the negative electrode, at least one lithium salt, at least one ionic liquid for which the percentage by weight in the electrolyte is greater than or equal to 20% and less than 50%; a separator for which the apparent contact angle between the surface thereof and the electrolyte is less than 20°.

18 Claims, 7 Drawing Sheets

(51) Int. Cl.
  *H01M 10/0525* (2010.01)
  *H01M 10/0567* (2010.01)
  *H01M 10/42* (2006.01)

(52) U.S. Cl.
  CPC ............... *H01M 10/4235* (2013.01); *H01M 2300/0025* (2013.01); *Y02E 60/122* (2013.01)

(58) Field of Classification Search
  USPC .................. 429/188, 324, 326–343, 247
  See application file for complete search history.

(56) References Cited

U.S. PATENT DOCUMENTS

| | | |
|---|---|---|
| 2005/0164087 A1 | 7/2005 | Fujita et al. |
| 2006/0088763 A1* | 4/2006 | Li et al. .................. 429/188 |
| 2006/0246356 A1 | 11/2006 | Abe et al. |
| 2007/0037064 A1* | 2/2007 | Nishida et al. ............. 429/338 |
| 2007/0243463 A1 | 10/2007 | Matsui et al. |
| 2008/0138700 A1 | 6/2008 | Horpel et al. |

FOREIGN PATENT DOCUMENTS

| | | |
|---|---|---|
| EP | 1 642 894 A1 | 4/2006 |
| EP | 1 689 016 A1 | 8/2006 |
| JP | 11-329495 A | 11/1999 |
| JP | 2007141489 A | 6/2007 |
| WO | 01/93363 A2 | 12/2001 |
| WO | 2004/082059 A1 | 9/2004 |
| WO | 2005/104269 A1 | 11/2005 |
| WO | 2005117175 A2 | 12/2005 |
| WO | 2006/030624 A1 | 3/2006 |
| WO | 2006104305 A1 | 10/2006 |

OTHER PUBLICATIONS

Non-aqueous Liquid Electrolytes for Lithium-Based Rechargeale Batteries; Kang Xu; Chem, Rev. 2004, 104, 4303-4417.
Battery Separators; Pankaj Arora and Zhengming (John) Zhang; Chem. Rev. 2004, 104, 4419-4462.
A review on the separators of liquid electrolyte Li-ion batteries; Zhang; Journal of Power Sources 164 (2007) 351-364.
An apparatus for the characterization of the static and dynamic wettability of complex interfaces; Aurenty, Lanet, Tessadro and Gandini AIP Review of Scientific instruments.
Critical review: Ionic liquids as electrolytes; Galinski; Lewadnowski; Stepniak; Science Direct; Electrochimica Acta 51 (2006) 5567-5580.
Advances in Lithium-Ion Batteries; Schalkawijk and Scrosati; 2002; eBook ISBN: 0-306-47508-1.

* cited by examiner

Imidazolium

Pyrazolium 1,2,4-Triazolium

Thiazolium

Oxazolium 1,2,3-Triazolium

Pyridazinium

Pyrimidinium

Pyrazinium

Ammonium

Phosphonium

Pyridinium

Pyrrolidinium

Piperidinium

LITHIUM-ION BATTERY CONTAINING AN ELECTROLYTE COMPRISING AN IONIC LIQUID

This is a National Stage Entry of Application No. PCT/FR2008/000802 filed Jun. 12, 2008 claiming priority to Application No. FR 07 04 264 filed Jun. 15, 2007.

TECHNICAL FIELD

The technical field of the invention is that of lithium-ion batteries and more particularly that of lithium-ion batteries containing a non-flammable electrolyte.

PRIOR ART

Due to their high energy density and energy/volume, lithium-ion batteries constitute a promising energy source.

A lithium-ion battery has an electrochemical bundle comprising alternating positive electrodes (cathodes) and negative electrodes (anodes) placed on each side of a separator membrane, generally made of polyolefin. Each positive electrode comprises an electrochemically active material capable of inserting lithium into its structure (generally an oxide of a lithiated transition metal such as $LiCoO_2$, $LiNiO_2$, $LiMnO_2$ or $LiMn_2O_4$). Each negative electrode comprises a substance capable of reversibly inserting lithium, such as carbon. The electrochemical bundle is impregnated with a non-aqueous solid or liquid electrolyte. The electrolyte contains a lithium salt dissolved in an organic solvent or, more often, a mixture of organic solvents.

These organic solvents are generally chosen from the group of linear or cyclic carbonates or from the group of esters. As examples of cyclic carbonates which are used conventionally, there can be mentioned propylene carbonate (PC) and ethylene carbonate (EC), and as examples of linear carbonates, dimethyl carbonate (DMC) or methyl ethyl carbonate (EMC). As examples of esters, there can be mentioned linear esters such as ethyl acetate (EA) or methyl butyrate (MB).

Generally, a passivation additive is added to the mixture of organic solvents, which forms a protective film on the surface of the negative electrode. This film prevents co-insertion of the solvent into the negative electrode, at the same time as the lithium, during operation of the battery. Reduction of the organic solvent in fact causes progressive degradation of the negative electrode during operation of the battery. This passivation film remains an ionic conductor. Generally, vinylene carbonate (VC) is used as the passivation additive.

The organic solvents mentioned previously are conductors and only slightly viscous. However, they have the drawback of being volatile and flammable. Research studies have therefore been carried out in order to provide a lithium-ion battery comprising an electrolyte the flammability of which is reduced.

It is known from the prior art to use an ionic liquid in an electrolyte of a lithium-ion battery in order to reduce its flammability. In fact, the ionic liquids are characterized by a high thermal stability and a reduced flammability. The documents WO2001/093363, WO2002/076924, WO2006/030624, WO2004/082059 and WO2005/104269 describe examples of ionic liquids.

The definition of an ionic liquid is given below. An ionic compound forms crystals in which positively-charged cations and negatively-charged anions are attracted to each other due to the electrostatic force existing between an anion and a cation. When this ionic compound is dissolved in a liquid, such as water, this liquid then has the property of conveying electricity; this is called an electrolyte. Electrolyte solutions are obtained by dissolving an ionic compound in an organic solvent. The electrolyte of a lithium-ion battery is for example conventionally obtained by dissolving a lithium salt, such as $LiPF_6$, in one or more of the organic solvents mentioned previously.

Certain ionic compounds, when subjected to a temperature increase, undergo a thermal activation capable of overcoming the electrostatic force between the anion and the cation. These ionic compounds therefore become liquids and are capable of conveying electricity. A salt in this state is generally denoted by the term "molten salt".

Some of these molten salts remain liquid at ambient temperature and do not solidify, even at a very low temperature. Such molten salts are denoted by the term "ambient temperature ionic liquids" or "ionic liquids".

The document WO2005/104269 describes a lithium-ion battery comprising a ceramic separator, an electrolyte comprising one or more ionic liquids, an additive for passivation of the negative electrode and a conductive lithium-based salt. The weight percentage of ionic liquid represents at least 50% of the electrolyte. This battery has a reduced flammability. However, it has a discharge capacity as well as a discharge voltage that are insufficient.

A battery is therefore sought having a high discharge voltage, a high capacity and stable under cycling conditions. The electrolyte of the battery sought must nevertheless retain a reduced flammability.

SUMMARY OF THE INVENTION

A subject of the invention is a battery containing:
- a positive electrode,
- a negative electrode,
- an electrolyte comprising:
    - an organic solvent chosen from the group comprising carbonates, linear esters of a saturated acid, or a mixture thereof,
    - an additive capable of forming a passivation film on the surface of the negative electrode,
    - at least one lithium salt,
    - at least one ionic liquid, the weight percentage of which in the electrolyte is greater than or equal to 20% and less than 50%;
- a separator, the apparent contact angle of which between its surface and the electrolyte is less than 20°.

Such a battery can be used in conditions of greater safety, as it has a reduced flammability. It has a high discharge voltage as well as a high capacity.

According to an embodiment, the weight percentage of the ionic liquid in the electrolyte is less than or equal to 40%.

According to an embodiment, the weight percentage of the ionic liquid in the electrolyte is less than or equal to 30%.

According to an embodiment, the weight percentage of the ionic liquid in the electrolyte is greater than or equal to 25%.

According to an embodiment, the ionic liquid is chosen from the group comprising 1-butyl 1-methyl pyrrolidinium bis(trifluoromethylsulphonyl)imide (BMP-TFSI), 1-butyl 1-methyl pyrrolidinium tris(pentafluoroethyl)trifluorophosphate (BMP-FAP), ethyl-(2-methoxyethyl)dimethyl ammonium bis(trifluoromethylsulphonyl)imide, 1-methyl 1-propyl piperidinium bis(trifluoromethylsulphonyl)imide.

According to an embodiment, the ionic liquid is 1-butyl 1-methyl pyrrolidinium bis(trifluoromethylsulphonyl)imide (BMP-TFSI).

According to an embodiment, the ionic liquid is 1-butyl 1-methyl pyrrolidinium tris(pentafluoroethyl)trifluorophosphate (BMP-FAP).

According to an embodiment, the ionic liquid is ethyl-(2-methoxyethyl)dimethylammonium bis(trifluoromethylsulphonyl)imide.

According to an embodiment, the ionic liquid is 1-methyl 1-propyl piperidinium bis(trifluoromethylsulphonyl)imide.

According to an embodiment, the organic solvent is constituted by ethylene carbonate and methyl ethyl carbonate in the respective proportions by volume of 40-60/40-60.

According to an embodiment, the organic solvent is constituted by propylene carbonate, ethylene carbonate and dimethyl carbonate in the respective proportions by volume of 10-30/10-30/50-70.

According to an embodiment, the organic solvent is constituted by ethylene carbonate, dimethyl carbonate and ethyl acetate in the respective proportions by volume of 10-20/20-30/50-70.

According to an embodiment, the separator comprises a support which is a non-woven material covered with alumina $Al_2O_3$ particles.

DETAILED DESCRIPTION OF THE EMBODIMENTS OF THE INVENTION

The present invention proposes a lithium-ion battery having a high capacity and high voltage on discharge, a stable capacity under cycling, while retaining a reduced flammability.

The battery according to the invention comprises an electrolyte comprising:
  a) an organic solvent chosen from the group comprising carbonates, linear esters of a saturated acid, or a mixture thereof,
  b) an additive capable of forming a passivation film on the surface of the negative electrode,
  c) at least one lithium salt,
  d) at least one ionic liquid, the weight percentage in the electrolyte of which is greater than or equal to 20% and less than 50%;

The electrolyte comprises an organic solvent which is:
  either one or more carbonates,
  or one or more linear esters of a saturated acid,
  or a mixture of one or more carbonates with one or more linear esters of a saturated acid.

Preferably, a mixture of carbonates is used, or a mixture of carbonates and a linear ester of a saturated acid.

The term "organic solvent" is used hereinafter to denote either one or more carbonates, or one or more linear esters of a saturated acid, or a mixture of one or more carbonates with one or more linear esters of a saturated acid.

The carbonates used can be chosen from the group of saturated cyclic carbonates comprising for example ethylene carbonate (EC), propylene carbonate (PC) or butylene carbonate (BC). These can also be chosen from the group of saturated linear carbonates comprising for example dimethyl carbonate (DMC), diethyl carbonate (DEC), methyl ethyl carbonate (EMC), methyl propyl carbonate (PMC).

The linear ester of a saturated acid is for example chosen from an acetate, a butyrate and a propionate. For example an ethyl acetate (EA), a methyl acetate, a propyl acetate, an ethyl butyrate, a methyl butyrate, a propyl butyrate, an ethyl propionate, a methyl propionate, a propyl propionate can be chosen.

According to a preferred embodiment, a PC/EC/DMC mixture is used in the respective proportions by volume of 10-30/10-30/50-70.

According to another preferred embodiment, a mixture of EC/DMC/EA is used, in the respective proportions by volume of 10-20/20-30/50-70.

According to another preferred embodiment, a mixture of EC/EMC is used, in the respective proportions by volume of 40-60/40-60.

The ionic liquid is constituted by the combination of an anion and a cation.

Figure 13:
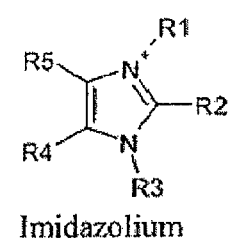
FIG. 13 represents the general formulae of each of the cations suitable for use in the ionic liquid.
Figure 13:
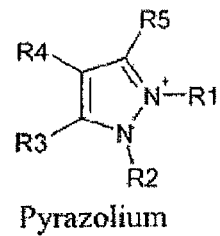
Figure 13:
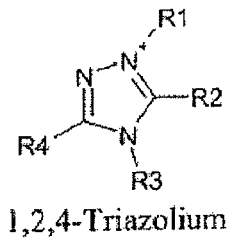
Figure 13:
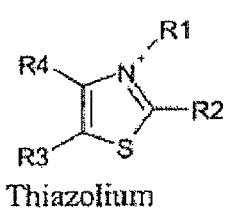
Figure 13:
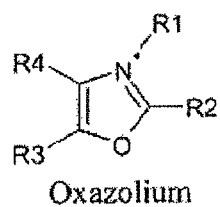
Figure 13:
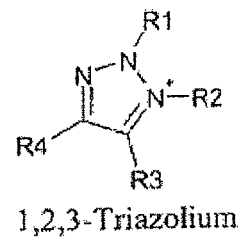
Figure 13:
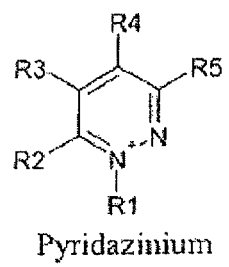
Figure 13:
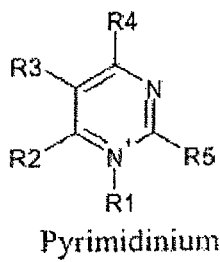
Figure 13:
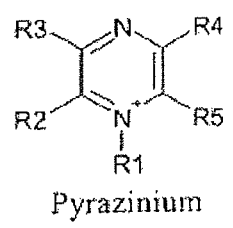
Figure 13:
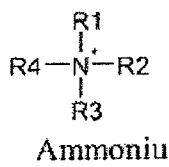
Figure 13:
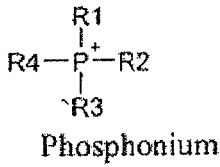
Figure 13:
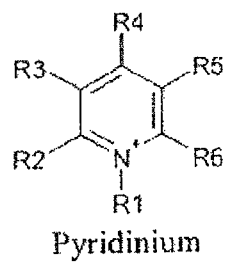
Figure 13:
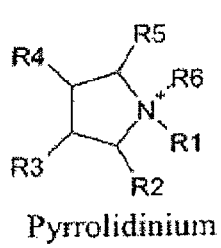
Figure 13:
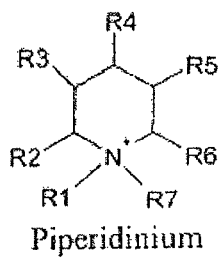

As a possible cation of the ionic liquid there can be mentioned imidazolium, pyrazolium, 1,2,4-triazolium, 1,2,3,-triazolium, thiazolium, oxazolium, pyridazinium, pyrimidinium, pyrazinium, ammonium, phosphonium, pyridinium, piperidinium and pyrrolidinium cations. The general formula of each of these compounds is shown in FIG. 13. $R_1$-$R_7$ represent independently of each other H, F or an alkyl group containing from 1 to 15 carbon atoms. The cation is preferably chosen from 1-butyl 1-methyl pyrrolidinium (BMP), ethyl-(2-methoxyethyl)dimethylammonium and 1-methyl 1-propyl piperidinium.

As a possible anion of the ionic liquid there can be mentioned tetrafluoroborate $BF_4^-$, hexafluorophosphate $PF_6^-$, hexafluoroarseniate $AsF_6^-$, bis(fluorosulphonyl)imide $(FSO_2)_2N^-$ (FSI), bis(trifluoromethylsulphonyl)imide (TFSI) $(CF_3SO_2)_2N^-$, bis(pentafluoroethylsulphonyl)imide $(CF_3CF_2SO_2)_2N^-$, tris(pentafluoroethyl)trifluorophosphate $(C_2F_5)_3PF_3^-$ (FAP), trifluoromethanesulphonate (triflate) $CF_3SO_3^-$. The anion is preferably chosen from tris(pentafluoroethyl)trifluorophosphate $[(C_2F_5)_3PF_3]^-$ (FAP), bis(trifluoromethylsulphonyl)imide $[(CF_3SO_2)_2N]$ (TFSI) and bis(fluorosulphonyl)imide $(FSO_2)_2N^-$ (FSI).

Figure 1:
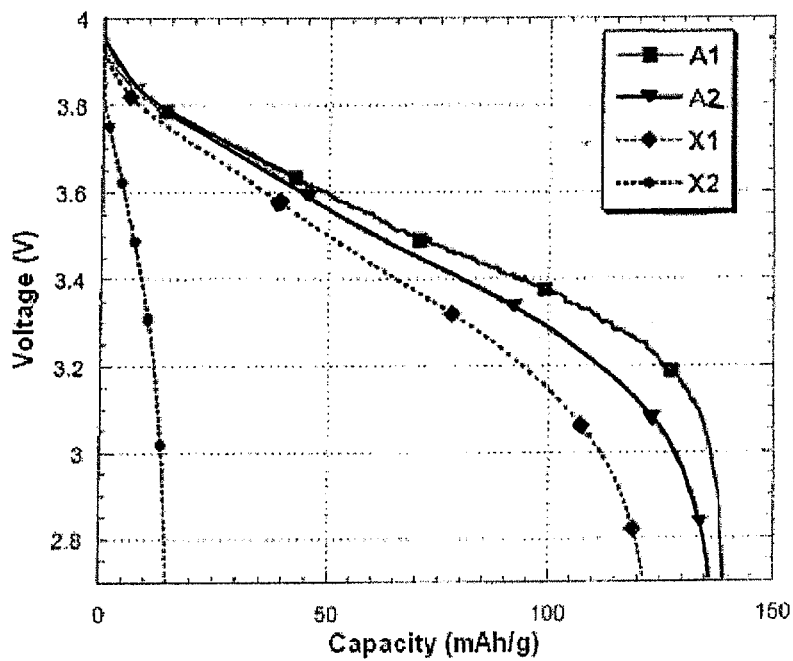
FIG. 1 represents discharge curves at ambient temperature, at a rate C/2, of 4/5 A format batteries according to the invention (A1, A2) and not according to the invention (X1, X2).
Figure 2:
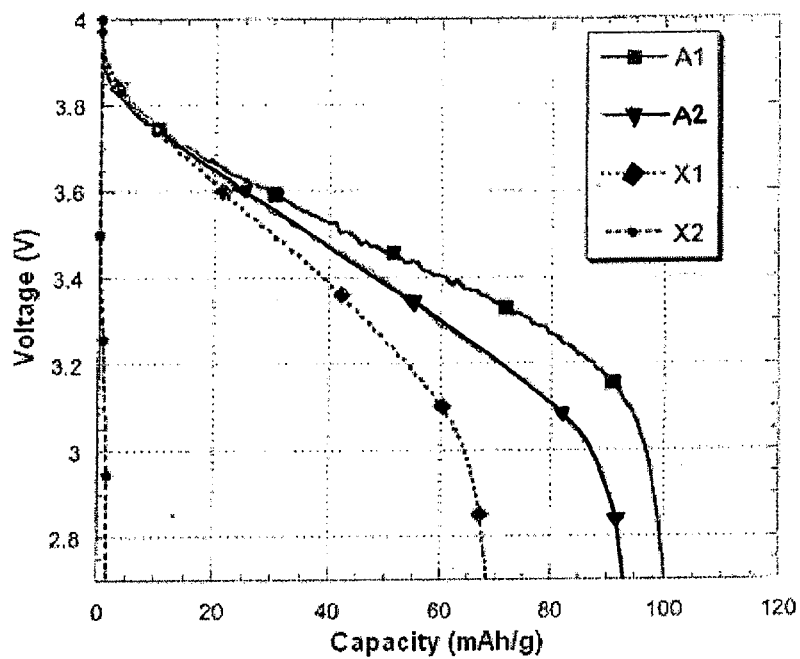
FIG. 2 represents discharge curves at ambient temperature, at a rate C, of 4/5 A format batteries according to the invention (A1, A2) and not according to the invention (X1, X2).
Figure 3:
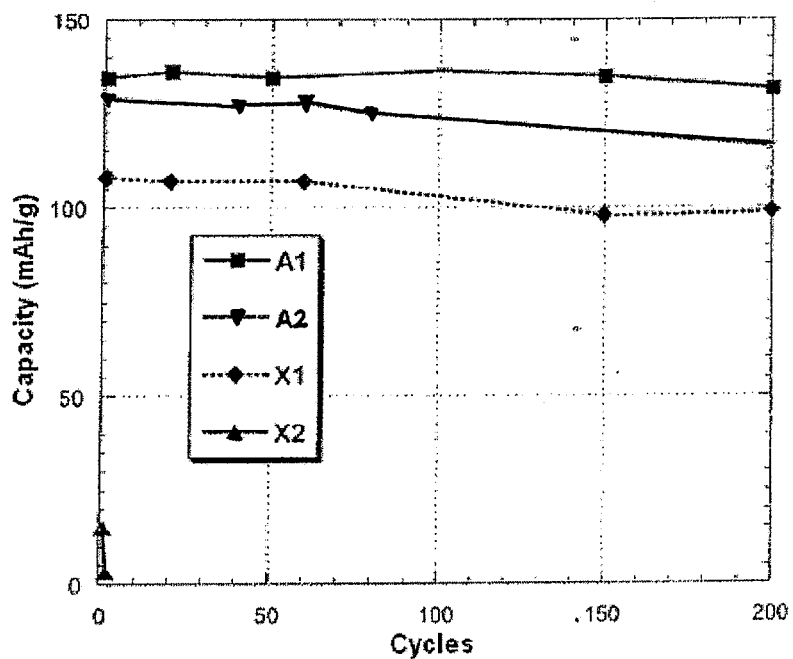
FIG. 3 represents the variation of the capacity discharged during one cycle at ambient temperature, at a rate of discharge C/2, for 4/5 A format batteries according to the invention (A1, A2) and not according to the invention (X1, X2).

The anion and the cation must be such that the ionic liquid is in the liquid state within the operational temperature range of the battery. The ionic liquid has the advantage of being thermally stable, non-flammable, non-volatile and only slightly toxic. Surprisingly, it was demonstrated that the weight percentage of ionic liquid in the electrolyte must be less than 50% for the battery to retain a high discharge capacity and voltage as well as good stability under cycling. When the weight percentage of ionic liquid in the electrolyte is greater than or equal to 50%, the capacity of the battery degrades, as shown in FIGS. 1, 2 and 3.

According to a further embodiment, the weight percentage of the ionic liquid in the electrolyte is less than or equal to 40%.

According to a further embodiment, the weight percentage of the ionic liquid in the electrolyte is less than or equal to 30%.

For the battery electrolyte to retain its non-flammable property, it is necessary for the weight percentage of the ionic liquid in the electrolyte to be greater than or equal to 20%.

According to an embodiment, the weight percentage of the ionic liquid in the electrolyte is greater than or equal to 25%.

The preferred ionic liquids are constituted by:
1-butyl 1-methyl pyrrolidinium (BMP) cation and bis(trifluoromethylsulphonyl)imide $[(CF_3SO_2)_2N]^-$ (TFSI) anion.
1-butyl 1-methyl pyrrolidinium (BMP) cation and tris(pentafluoroethyl)trifluorophosphate $[(C_2F_5)_3PF_3]^-$ (FAP) anion.
ethyl-(2-methoxyethyl)dimethylammonium cation and bis(trifluoromethylsulphonyl)imide $[(CF_3SO_2)_2N]^-$ (TFSI) anion.
1-methyl 1-propyl piperidinium cation and bis(trifluoromethylsulphonyl)imide $[(CF_3SO_2)_2]^-$ TFSI) anion.

The electrolyte can contain a mixture of several ionic liquids.

A passivation additive capable of forming a passivation film on the surface of the negative electrode is added to the organic solvent and the ionic liquid(s). This passivation film forms on the surface of the negative electrode when the latter is placed in contact with the electrolyte solvent. This film protects the negative electrode against co-insertion of the solvent with the $Li^+$ ions during the operation of the battery. As a passivation additive, vinylene carbonate (VC) can be mentioned, which is an unsaturated cyclic carbonate. Preferably, VC is present in a quantity ranging from 0.1 to approximately 5% of the volume of the other constituents of the electrolyte.

At least one lithium salt is dissolved in the mixture constituted by the organic solvent, the ionic liquid(s) and the passivation additive. The lithium salt is for example chosen from lithium hexafluorophosphate $LiPF_6$, lithium tris(pentafluoroethyl)trifluorophosphate LiFAP, lithium bis oxalatoborate LiBOB, lithium perchlorate $LiClO_4$, lithium hexafluoroarsenate $LiAsF_6$, lithium tetrafluoroborate $LiBF_4$, lithium trifluoromethanesulphonate $LiCF_3SO_3$, lithium trifluoromethane sulfonimide $LiN(CF_3SO_2)_2$ (LiTFSI), or lithium trifluoromethanesulphonemethide $LiC(CF_3SO_2)_3$ (LiTFSM). The anion of the lithium salt can be identical to the anion of the ionic liquid. Preferably the lithium salt(s) is (are) added at the rate of 0.1 to 2 mol/L.

The battery according to the invention comprises at least one positive electrode, at least one negative electrode, a separator and the electrolyte as described above.

The active material of the positive electrode can be a lithiated oxide of a transition metal such as $LiCoO_2$, $LiNiO_2$, $LiMnO_2$, $LiMn_2O_4$, $LiFePO_4$. It can also be the result of the substitution of a part of the main metal of these substances by one or more transition metals. In particular, the nickel of a mixed nickel-lithium oxide by one or more transition metals such as Co, Mn, Al, Mg, Ti.

The active material of the positive electrode can also optionally be coated.

According to an embodiment, the positive active material has the formula
$LiNi_{1-x-y}Co_xAl_yO_2$ with x comprised between 0.10 and 0.20 and y comprised between 0.01 and 0.10.

The active material of the negative electrode is a substance capable of inserting lithium into its structure. Advantageously, the substance capable of inserting lithium into its structure is a carbonaceous substance. This carbonaceous substance is preferably chosen from graphite, coke, carbon black and glassy carbon. The carbonaceous material can also optionally be coated.

The separator is characterized by a high wettability in the electrolyte. Generally, when a liquid is placed in contact with the surface of a solid, a contact angle (or contact line) of the liquid is formed on the surface of the solid. The smaller the contact angle, the better is the wettability of the separator. When there is perfect wettability, the contact angle becomes zero. The separator according to the invention is characterized by an apparent contact angle with the electrolyte of less than 20°.

Figure 12A:
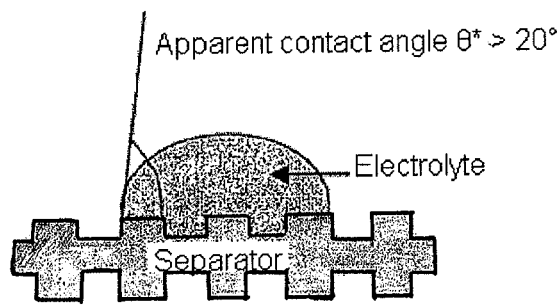
FIGS. 12a and 12b illustrate respectively a poor and a good wettability of the separator.
Figure 12B:
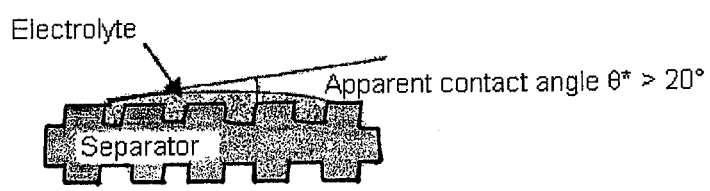

The contact angle is defined as the angle between a drop and a flat surface. The apparent contact angle is defined as the angle between a drop and a rough surface. The diagrams of FIGS. 12*a* and 12*b* define the apparent contact angle between the surface of the separator and the electrolyte. The separator of FIG. 12*a* has poor wettability. The separator of FIG. 12*b* has good wettability.

Preferably, such a separator is a ceramic separator. Such a separator comprises a flexible substrate comprising polyolefin fibres, preferably non-woven, and a ceramic coating. The substrate can be constituted by fibres of polyethylene (PE) or polypropylene (PP) or polyethylene terephthalate (PET). The separator is covered with particles of a metal oxide which can be alumina $Al_2O_3$.

The invention applies to electrodes of any format prismatic format (flat electrodes), cylindrical format (spiral electrodes) or concentric (coil).

Other characteristics and advantages of the present invention will become apparent from the following example embodiments, given by way of illustration and non-limitatively.

EXAMPLES

Example 1

Influence of the Percentage of Ionic Liquid in the Electrolyte

Four cylindrical batteries A1, A2, X1 and X2 of 4/5 A format were prepared. They each comprise:
  a positive electrode containing a positive active material of chemical formula $LiNi_{0.80}Co_{0.15}Al_{0.05}O_2$,
  a negative electrode of graphite,
  a non-woven separator PET coated with particles of $Al_2O_3$ (ceramic separator).

The electrolyte of the batteries A1 and A2 according to the invention contains:
  A1: 70% PC/EC/DMC (20/20/60)+30% BMP TFSI,
  A2: 60% PC/EC/DMC (20/20/60)+40% BMP TFSI, The electrolyte of the batteries X1 and X2 not according to the invention contains:
  X1: 50% PC/EC/DMC (20/20/60)+50% BMP TFSI.
  X2: 20% PC/EC/DMC (20/20/60)+80% BMP TFSI.
  The electrolytes of the batteries A1, A2, X1, X2 all contain $LiPF_6$ 1 Mol/L and 1% VC. These electrolyte compositions are all non-flammable (Manila paper test: Strips of 1 cm wide and 10 cm long are cut out in Manila paper then dipped in the electrolyte. These impregnated strips are then suspended on a metal support and a flame is brought close underneath)

Electrical Test:
The batteries A1, A2, X1 and X2 underwent:
a "forming" cycle at 60° C. to allow the batteries to reach their nominal capacity,
a characterization at ambient temperature at charging rates C/5 and discharge rates C/2 and C,
200 cycles of cycling at rate C/2 at ambient temperature.

FIGS. 1 and 2 show that at discharge rates C/2 and C, the capacity discharged by the batteries A1 and A2 is very satisfactory. In contrast, the discharge capacities of the batteries X1 and X2 are insufficient.

FIG. 3 further shows that the batteries A1 and A2 have a stable capacity under cycling. The best result is obtained with the battery A1, the discharge capacity of which varies hardly at all after 200 cycles and remains comprised between 130 and 135 mAh/g.

Example 2

Influence of the Nature of the Separator

Three batteries A1, X3 and X4 of format 4/5 A were prepared. They each comprise:
  a positive electrode ($LiNi_{0.80}Co_{0.15}Al_{0.05}O_2$),
  a negative electrode of graphite, and
  an identical electrolyte composition comprising:
    70% of a mixture of carbonates constituted by PC/EC/DMC (20/20/60)
    30% of ionic liquid: 1-butyl 1-methyl pyrrolidinium (BMP) cation and bis(trifluoromethylsulphonyl)imide $[(CF_3SO_2)_2N]^-$ (TFSI) anion
    $LiPF_6$ 1 Mol/L
    1% VC This electrolyte composition is non-flammable (Manila paper test).

The battery A1 according to the invention contains a non-woven separator covered with particles of alumina $Al_2O_3$ (ceramic separator). The wettability tests show that the surface of such a separator and the electrolyte form a contact angle of less than 20°.

The battery X3 not according to the invention contains a three-layer polypropylene/polyethylene/polypropylene separator, the contact angle with the electrolyte of which is greater than 40°.

The battery X4 not according to the invention contains a polyethylene separator, the contact angle with the electrolyte of which is greater than 40°.

The separators of the batteries X3 and X4 do not have a high wettability.

The batteries A1, X3 and X4 underwent the same electrical tests as in Example 1.

Figure 4:
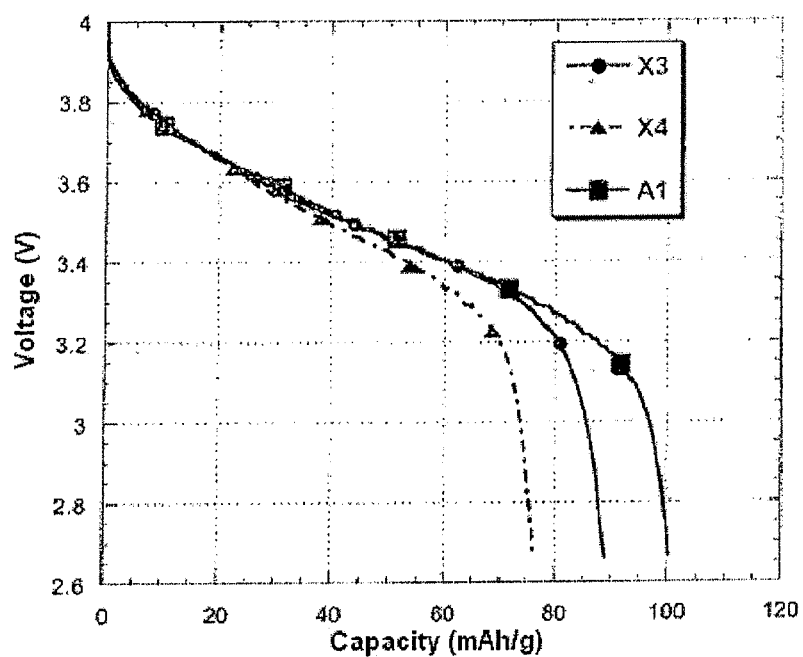
FIG. 4 represents the discharge curves at ambient temperature, at a rate C, for 4/5 A format batteries according to the invention (A1) and not according to the invention (X3, X4).

FIG. 4 shows that the highest discharge capacity at rate C is obtained for the battery A1 having a ceramic separator.

Figure 5:
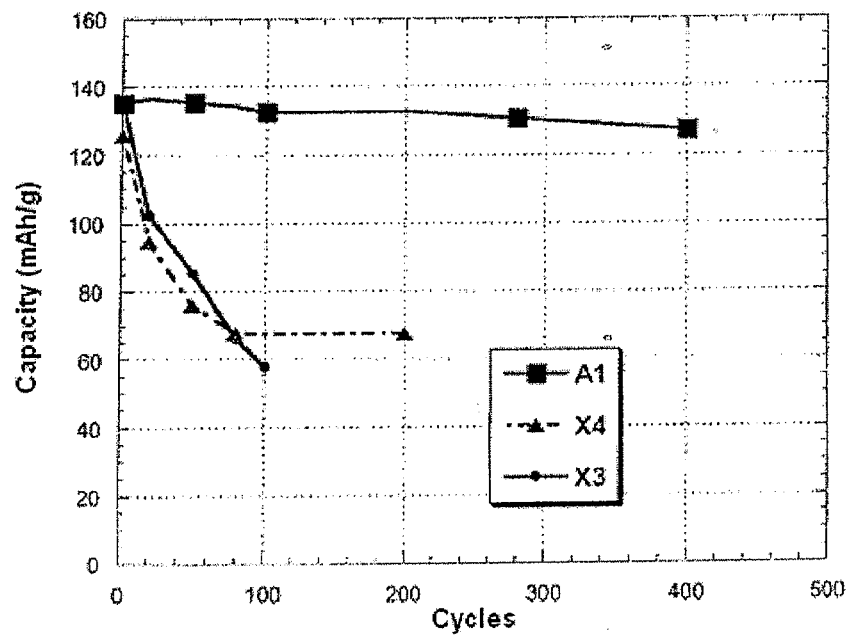
FIG. 5 represents the variation of the capacity discharged during one cycle at ambient temperature, at a rate of C/2, of a 4/5 A format battery according to the invention (A1) and not according to the invention (X3, X4).

FIG. 5 shows that the battery having the most stable capacity under cycling is also the battery A1. The capacity of the batteries X3 and X4 is not stable during cycling.

Example 3

Influence of the Nature of the Anion of the Ionic Liquid

Three batteries A1, A3, A4 of format 4/5 A were prepared. They each contain:
  a positive electrode ($LiNi_{0.80}Co_{0.15}Al_{0.05}O_2$),
  a negative electrode of graphite,
  a non-woven separator covered with particles of $Al_2O_3$ (ceramic separator).
  an electrolyte containing 70% of a mixture of carbonates constituted by PC/EC/DMC (20/20/60) and 30% of ionic liquid, the cation of which is 1-butyl 1-methyl pyrrolidinium (BMP).

The anion of the ionic liquid of the battery A1 according to the invention is bis(trifluoromethylsulphonyl)imide $[(CF_3SO_2)_2]^-$ (TFSI).

The anion of the ionic liquid of the battery A3 according to the invention is bis(fluorosulphonyl)imide $[(FSO_2)_2N]^-$ (FSI).

The anion of the ionic liquid of the battery A4 according to the invention is tris(pentafluoroethyl)trifluorophosphate $[(C_2F_5)_3PF_3]^-$ (FAP).

The electrolyte of the batteries A1, A3 and A4 contains $LiPF_6$ 1 Mol/L and 1% VC.

The batteries A1, A3 and A4 underwent the same electrical tests as in Example 1. The batteries A1, A3 and A4 have a high capacity and a good stability under cycling.

Figure 6:
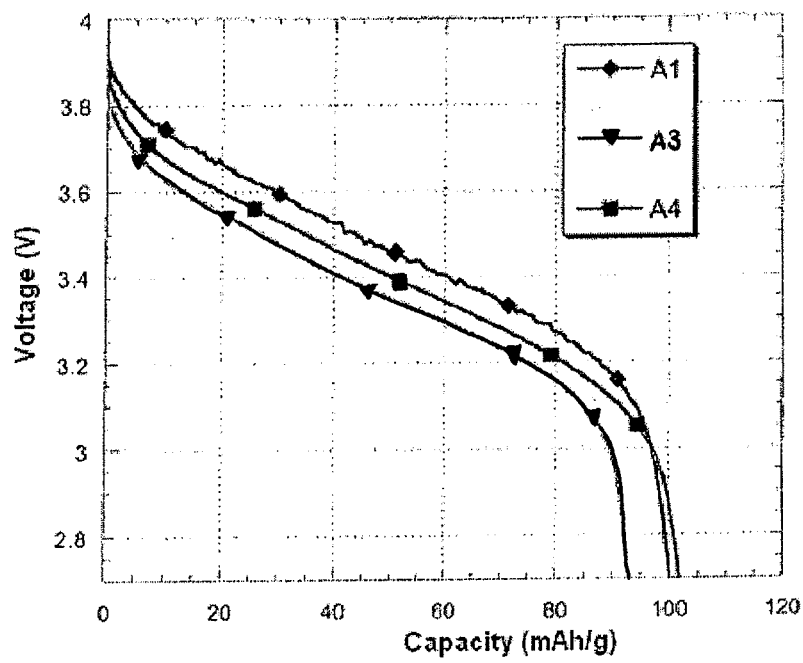
FIG. 6 represents the discharge curves at ambient temperature, at a rate of C, of 4/5 A format batteries according to the invention (A1, A3, A4).
Figure 7:
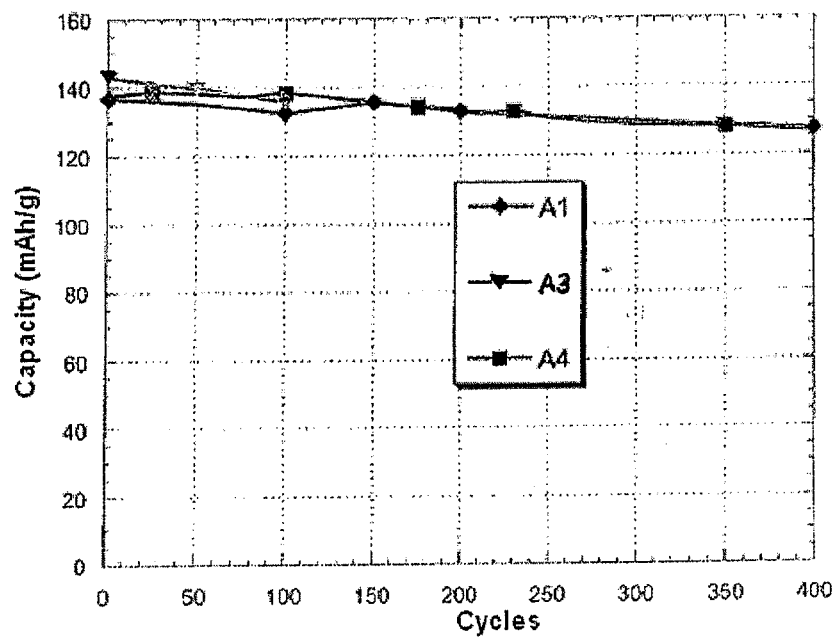
FIG. 7 represents the variation of the capacity discharged during one cycle at ambient temperature, at a rate of C/2, of 4/5 A format batteries according to the invention (A1, A3, A4).

FIGS. 6 and 7 show that the best discharge results at C and under cycling at C/2 are obtained with the butyl methyl pyrrolidinium cation and the TFSI and FAP anions (A1 and A4).

Example 4

Influence of the Nature of the Cation of the Ionic Liquid

Three batteries A1, A5 and A6 of format 4/5 A were prepared. They each contain:
  a positive electrode ($LiNi_{0.50}Co_{0.15}Al_{0.05}O_2$),
  a negative electrode of graphite,
  a non-woven separator coated with particles of $Al_2O_3$ (ceramic separator).
  an electrolyte containing 70% of a mixture of carbonates constituted by PC/EC/DMC (20/20/60) and 30% of ionic liquid, the anion of which is bis(trifluoromethylsulphonyl)imide [$(CF_3SO_2)_2N$]⁻ (TFSI).

The cation of the ionic liquid of the battery A1 according to the invention is 1-butyl 1-methyl pyrrolidinium (BMP).

The cation of the ionic liquid of the battery A5 according to the invention is ethyl-(2-methoxyethyl)dimethylammonium.

The cation of the ionic liquid of the battery A6 according to the invention is 1-methyl 1-propyl piperidinium.

The electrolyte of the batteries A1, A5 and A6 contains $LiPF_6$ 1 Mol/L and 1% VC.

The batteries A1, A5 and A6 underwent the same electrical tests as in Example 1.

Figure 8:
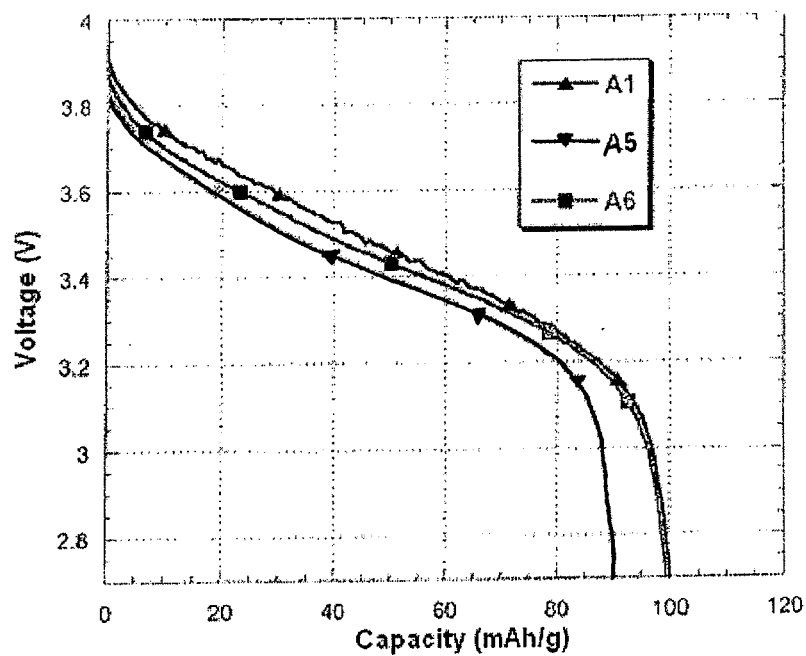
FIG. 8 represents the discharge curves at ambient temperature, at a rate of C, of 4/5 A format batteries according to the invention (A1, A5, A6)

FIG. 8 shows that the best discharge result at C is obtained with 1-butyl 1-methyl pyrrolidinium and 1-methyl 1-propyl piperidinium cations and the TFSI (A1 and A6) anion.

Figure 9:
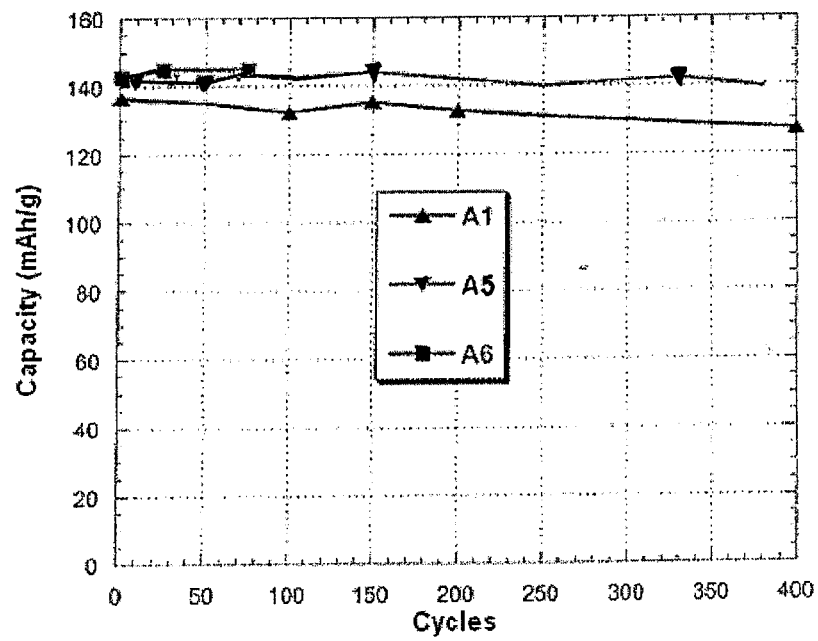
FIG. 9 represents the variation of the capacity discharged during one cycle at ambient temperature, at a rate of C/2, of 4/5 A format batteries according to the invention (A1, A5, A6).

FIG. 9 shows that a good stability under cycling is obtained when the TFSI anion is combined with one of the 1-butyl 1-methyl pyrrolidinium (A1), ethyl(2-methoxyethyl)dimethylammonium (A5) or 1-methyl 1-propyl piperidinium (A6) cations.

Example 5

Influence of the Composition of the Mixture of Carbonates

Three batteries A1, A7 and A8 of format 4/5 A were prepared. They each contain:
 a positive electrode $LiNi_{0.80}CO_{0.15}Al_{0.05}O_2$,
 a negative electrode of graphite,
 a non-woven separator coated with particles of $Al_2O_3$ (ceramic separator).
 an electrolyte containing 70% of a mixture of carbonates and 30% of ionic liquid, the anion of which is bis(trifluoromethylsulphonyl)imide [$(CF_3SO_2)_2N$]⁻ (TFSI) and the cation is 1-butyl 1-methyl pyrrolidinium.

The solvent of the electrolyte of the battery A1 is a mixture of carbonates PC/EC/DMC (20/20/60).

The solvent of the electrolyte of the battery A7 is a mixture of carbonates EC/EMC (50/50).

The solvent of the electrolyte of the battery A8 is a mixture of carbonates and an acetate EC/DMC/EA (15/25/60).

The batteries A1, A7 and A8 underwent the same electrical tests as in Example 1.

Figure 10:
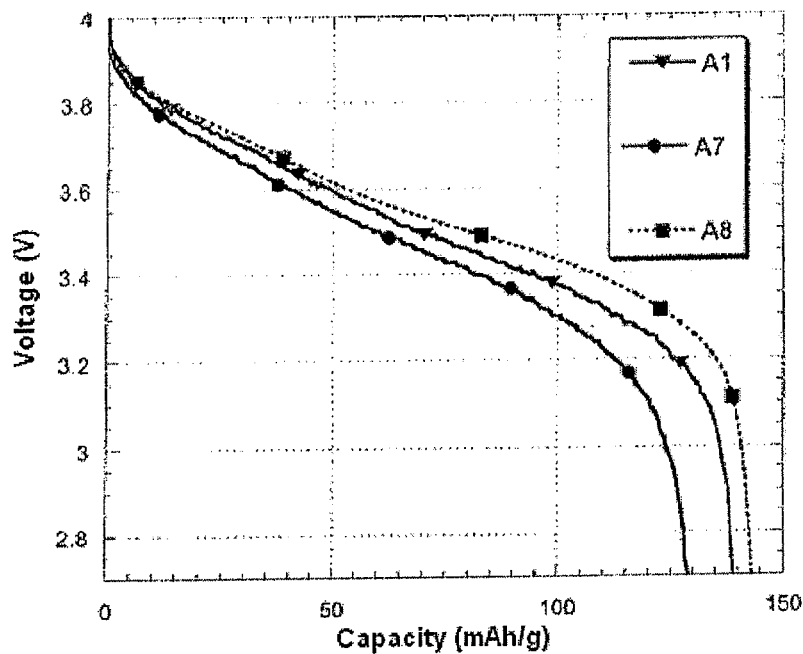
FIG. 10 represents the discharge curves at ambient temperature, at a rate of C/2, of 4/5 A format batteries according to the invention (A1, A7, A8).
Figure 11:
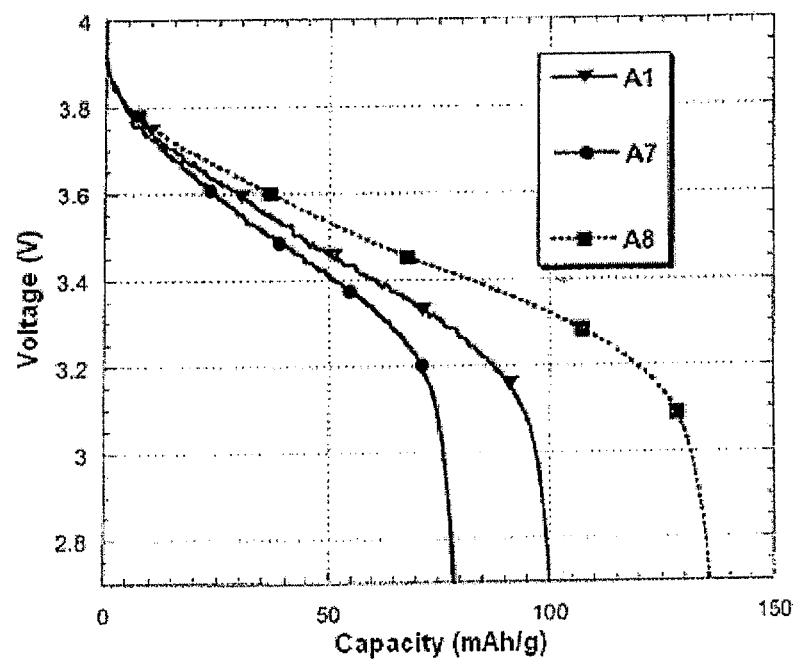
FIG. 11 represents the discharge curves at ambient temperature, at a rate of C, of 4/5 A format batteries according to the invention (A1, A1, A8).

FIGS. 10 and 11 show that the best characterization results at C/2 and at C are obtained with the electrolyte composition containing the mixture of carbonates and acetate EC/DMC/EA (15/25/60), followed by the electrolyte composition containing the mixture of carbonates PC/EC/DMC (20/20/60).

The invention claimed is:

1. A battery containing:
 a positive electrode,
 a negative electrode,
 a non-flammable electrolyte comprising:
  an organic solvent chosen from a group consisting of carbonates, linear esters of a saturated acid, and a mixture thereof,
  an additive capable of forming a passivation film on the surface of the negative electrode,
  at least one lithium salt selected from the group consisting of lithium hexafluorophosphate $LiPF_6$, lithium tris(pentafluoroethyl)trifluorophosphate LiFAP, lithium bis oxalatoborate LiBOB, lithium perchlorate $LiClO_4$, lithium hexafluoroarsenate $LiAsF_6$, lithium tetrafluoroborate $LiBF_4$, lithium trifluoromethanesulphonate $LiCF_3SO_3$, lithium trifluoromethane sulfonimide LiN$(CF_3SO_2)_2$ (LiTFSI), and lithium trifluoromethanesulphonemethide $LiC(CF_3SO_2)_3$ (LiTFSM), and
  at least one ionic liquid, wherein a weight percentage ratio of the ionic liquid relative to the organic solvent is from 30:70 to less than 50:50; said ionic liquid being selected from the group consisting of
   i) 1-butyl 1-methyl pyrrolidinium bis(trifluoromethylsulphonyl)imide (BMP-TFSI),
   ii) 1-butyl 1-methyl pyrrolidinium tris(pentafluoroethyl)trifluorophosphate (BMP-FAP), and
   iii) 1-butyl 1-methyl pyrrolidinium bis(fluorosulphonyl)imide (BMP-FSI) and
 a separator, having an apparent contact angle between its surface and the electrolyte that is less than 20°.

2. The battery according to claim 1, in which the at least one ionic liquid is 1-butyl 1-methyl pyrrolidinium bis(trifluoromethylsulphonyl)imide (BMP-TFSI).

3. The battery according to claim 1, in which the at least one ionic liquid is 1-butyl 1-methyl pyrrolidinium tris(pentafluoroethyl)trifluorophosphate (BMP-FAP).

4. The battery according to claim 1, in which the organic solvent is constituted by ethylene carbonate and methyl ethyl carbonate in the respective proportions by volume of 40-60/40-60.

5. The battery according to claim 1, in which the organic solvent is constituted by propylene carbonate, ethylene carbonate and dimethyl carbonate in the respective proportions by volume of 10-30/10-30/50-70.

6. The battery according to claim 1, in which the organic solvent is constituted by ethylene carbonate, dimethyl carbonate and ethyl acetate in the respective proportions by volume of 10-20/20-30/50-70.

7. The battery according to claim 1, in which the separator comprises a support which is a non-woven material coated with particles of alumina $Al_2O_3$.

8. The battery according to claim 1, in which the weight percentage of the ionic liquid in the electrolyte is from 30% to 40%.

9. A battery containing:
 a positive electrode,
 a negative electrode,
 a non-flammable electrolyte comprising:
  an organic solvent chosen from the group comprising carbonates, linear esters of a saturated acid, or a mixture thereof,
  an additive capable of forming a passivation film on the surface of the negative electrode,
  at least one lithium salt selected from the group consisting of lithium hexafluorophosphate $LiPF_6$, lithium tris(pentafluoroethyl)trifluorophosphate LiFAP, lithium hexafluoroarsenate $LiAsF_6$, lithium tetrafluoroborate $LiBF_4$, lithium trifluoromethanesulphonate $LiCF_3SO_3$, lithium trifluoromethane sulfonimide LiN$(CF_3SO_2)_2$ (LiTFSI), and lithium trifluoromethanesulphonemethide $LiC(CF_3SO_2)_3$ (LiTFSM), and
  at least one ionic liquid, wherein a weight percentage ratio of the ionic liquid relative to the organic solvent is from 30:70 to less than 50:50; said ionic liquid being selected from the group consisting of
   i) 1-butyl 1-methyl pyrrolidinium bis(trifluoromethylsulphonyl)imide (BMP-TFSI),
   ii) 1-butyl 1-methyl pyrrolidinium tris(pentafluoroethyl)trifluorophosphate (BMP-FAP), and iii) 1-butyl 1-methyl pyrrolidinium bis(fluorosulphonyl)imide (BMP-FSI); and a separator, apparent contact angle of which between its surface and the electrolyte is less than 20°.

10. The battery according to claim 9, in which the organic solvent is constituted by ethylene carbonate and methyl ethyl carbonate in the respective proportions by volume of 40-60/40-60.

11. The battery according to claim 9, in which the organic solvent is constituted by propylene carbonate, ethylene carbonate and dimethyl carbonate in the respective proportions by volume of 10-30/10-30/50-70.

12. The battery according to claim 9, in which the organic solvent is constituted by ethylene carbonate, dimethyl carbonate and ethyl acetate in the respective proportions by volume of 10-20/20-30/50-70.

13. The battery according to claim 9, in which the separator comprises a support which is a non-woven material coated with particles of alumina $Al_2O_3$.

14. A non-flammable battery containing:
a positive electrode,
a negative electrode,
a non-flammable electrolyte comprising:
an organic solvent chosen from the group comprising carbonates, linear esters of a saturated acid, or a mixture thereof,
an additive capable of forming a passivation film on the surface of the negative electrode,
at least one lithium salt which is lithium hexafluorophosphate $LiPF_6$, and
at least one ionic liquid, wherein a weight percentage ratio of the ionic liquid relative to the organic solvent is from 30:70 to less than 50:50; said ionic liquid being selected from the group consisting of
i) 1-butyl 1-methyl pyrrolidinium bis(trifluoromethylsulphonyl)imide (BMP-TFSI),
ii) 1-butyl 1-methyl pyrrolidinium tris(pentafluoroethyl)trifluorophosphate (BMP-FAP), and
iii) 1-butyl 1-methyl pyrrolidinium bis(fluorosulphonyl)imide (BMP-FSI)
a separator, apparent contact angle of which between its surface and the electrolyte is less than 20°.

15. The battery according to claim 14, in which the organic solvent is constituted by ethylene carbonate and methyl ethyl carbonate in the respective proportions by volume of 40-60/40-60.

16. The battery according to claim 14, in which the organic solvent is constituted by propylene carbonate, ethylene carbonate and dimethyl carbonate in the respective proportions by volume of 10-30/10-30/50-70.

17. The battery according to claim 14, in which the organic solvent is constituted by ethylene carbonate, dimethyl carbonate and ethyl acetate in the respective proportions by volume of 10-20/20-30/50-70.

18. The battery according to claim 14, in which the separator comprises a support which is a non-woven material coated with particles of alumina $Al_2O_3$.

* * * * *

UNITED STATES PATENT AND TRADEMARK OFFICE
CERTIFICATE OF CORRECTION

PATENT NO. : 9,543,617 B2  
APPLICATION NO. : 12/664616  
DATED : January 10, 2017  
INVENTOR(S) : Clemence Siret et al.

Page 1 of 1

It is certified that error appears in the above-identified patent and that said Letters Patent is hereby corrected as shown below:

On the Title Page

Assignee (73);

"SAFT, Bagnolet (FR)" has been replaced with --SAFT GROUPE SA, Bagnolet (FR)--

Signed and Sealed this  
Ninth Day of May, 2017

Michelle K. Lee  
*Director of the United States Patent and Trademark Office*